J. LINDEBERG.
MARKING BUTTON FOR ANIMALS.
APPLICATION FILED DEC. 26, 1914.
1,159,593.
Patented Nov. 9, 1915.
FIG. 1
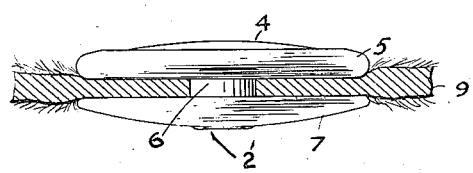
FIG. 2
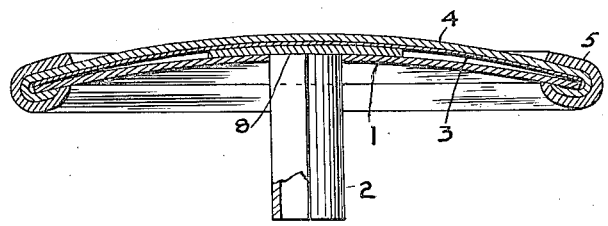
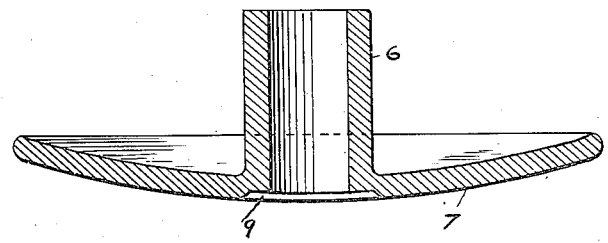
FIG. 3
WITNESSES:
A. H. Kephart
Leon Boillot
INVENTOR
J. LINDEBERG
BY
Carlos P. Griffin
ATTORNEY

UNITED STATES PATENT OFFICE.

JAFET LINDEBERG, OF SAN FRANCISCO, CALIFORNIA, ASSIGNOR OF ONE-HALF TO RUDOLPH HEROLD, JR., OF SAN FRANCISCO, CALIFORNIA.

MARKING-BUTTON FOR ANIMALS.

1,159,593. Specification of Letters Patent. Patented Nov. 9, 1915.

Application filed December 26, 1914. Serial No. 879,095.

*To all whom it may concern:*

Be it known that I, JAFET LINDEBERG, a citizen of the United States, residing at San Francisco, in the county of San Francisco, State of California, have invented a new and useful Marking-Button for Animals, of which the following is a specification in such full and clear terms as will enable those skilled in the art to construct and use the same.

This invention relates to a marking button for animals and its object is to produce a button which will clearly identify the animal and which will be capable of such hard usage as animals ordinarily give to things which may be secured to them for identification purposes.

This device is secured to the animal by punching a hole in the ear after which the upper and lower portions of the button are pressed through the hole and one part of the button is clenched against the other part, thereby securing the button in place.

An embodiment of the invention is shown in the drawing in which the same reference numeral is applied to the same portion throughout, but I am aware that there are many modifications thereof.

Figure 1 is a side elevation of the complete button, Fig. 2 is a sectional view through the upper portion of the button, and Fig. 3 is a sectional view through the lower portion of the button.

The numeral 1 indicates a suitable metal plate having its edges rounded over and to which is secured the hollow split shank 2, said shank having the head 8 to secure it to the metal plate 1. Over the top of the metal plate 1 there is placed a printed identification card 3 which card is protected from the weather by means of a celluloid or other flexible transparent disk 4, said transparent disk being secured to the button by means of the inturned metal ring 5, said ring protecting the edges of the transparent material or card and securing the several parts of the button together.

The other portion of the button has a base 7 and hollow shank 6, said hollow shank being of the size desired for the hole punched in the animal's ear and the two parts of the button are assembled thereon, whereupon the split shank 2 is clenched over the outside of the base 7, thus securing the button on the animal's ear. The base 7 has a depression 9 formed therein so that when the hollow shank is clenched in place that it will present a substantially smooth aspect such as is illustrated at 2' in Fig. 1.

Having thus described my invention what I claim as new and desire to secure by Letters Patent of the United States, is as follows, modifications within the scope of the claims being expressly reserved:

1. A marking button for animals comprising a metal button having a split shank projecting therefrom, an identification slip carried thereby, a transparent covering for said identification slip, means to secure the transparent covering and the identification slip to the disk, and a second disk having a hollow shank to which the first disk is adapted to be permanently secured by having the first shank passed through the hollow shank and clenched thereto.

2. A marking button for animals comprising a disk having a shank projecting therefrom, an identification slip carried thereby, a transparent covering for said identification slip, a protecting ring around the outer edges of the disk securing the transparent covering, printed slip and disk together, and a second disk having a hollow shank to which the first disk is adapted to be permanently secured by having the first shank passed through the hollow shank and clenched thereto.

In testimony whereof I have hereunto set my hand this 11th day of December A. D. 1914, in the presence of two subscribed witnesses.

JAFET LINDEBERG.

Witnesses:
C. P. GRIFFIN,
L. H. ANDERSON.